United States Patent [19]

Suzuki et al.

[11] Patent Number: 4,526,454
[45] Date of Patent: Jul. 2, 1985

[54] CAMERA HAVING SOLID STATE DIAPHRAGM DEVICE

[75] Inventors: Ryoichi Suzuki; Takashi Uchiyama, both of Kanagawa, Japan

[73] Assignee: Canon Kabushiki Kaisha, Tokyo, Japan

[21] Appl. No.: 171,477

[22] Filed: Jul. 23, 1980

[30] Foreign Application Priority Data

Jul. 27, 1979 [JP] Japan .................................. 54-95659

[51] Int. Cl.³ .............................................. G03B 9/56
[52] U.S. Cl. ................................................ 354/227.1
[58] Field of Search .......................... 354/43, 227, 271

[56] References Cited
U.S. PATENT DOCUMENTS

4,054,890 10/1977 Shimomura ......................... 354/227

Primary Examiner—Russell E. Adams
Attorney, Agent, or Firm—Toren, McGeady, Stanger

[57] ABSTRACT

A solid state diaphragm device is constructed by the use of an electrochromie material. Prior to an initiation of a shutter operation, the above-described solid state diaphragm device is supplied with a predetermined amount of driving current flowing in a direction to excite the electrochromie material for production of a color, thereby the size of density of aperture of the diaphragm is adjusted to the aperture information given from the camera body. During the shutter operation, the current supply to said solid state diaphragm device is cut off. After a termination of the shutter operation, an equal amount of current to that of the driving current is allowed to flow in the reversed direction to said solid state diaphragm device, thereby the full open aperture position is regained. The amount of current supplied to said solid state diaphragm device is controlled in accordance with the output of a light metering circuit.

3 Claims, 10 Drawing Figures

CAMERA HAVING SOLID STATE DIAPHRAGM DEVICE

BACKGROUND OF THE INVENTION

This invention relates to cameras with diaphragm devices employing electro- or magneto-optical elements whose transmittance is varied by application of an electrical or magnetic field, or so-called solid state diaphragm devices, and, more particularly to cameras having a solid state diaphragm device employing an electrochromie material.

The conventional cameras have generally employed mechanical type of diaphragm devices. The fact that the system for controlling the operation of such diaphragm device is necessarily of mechanical structure and that, in the case of cameras using interchangeable lenses, there is a need to provide a complicated coupling mechanism for selectively establishing an operative connection between the diaphragm device in the interchangeable lens mounting and a control mechanism therefor in the camera body, form the causes for an increase in the camera unit cost, an increase in the bulk and size of the camera, a limitation of the degree of freedom of the camera design, or the like.

Taking these factors in consideration, attemps have been made to employ an electro- or magneto-optical element whose transmittance can be varied with variation of the electrical or magnetic field applied thereto as the diaphragm of the camera, and a wide variety of so-called solid state diaphragm devices have been proposed. As the above-described electro- or magneto-optical element, mention may be made of a Kerr cell utilizing the double refraction phenomenon, a transparent ferroelectric substance (PLZT), liquid crystal and Faraday element. This element is used in combination with a polarizer and an analyser. Besides these, there are known electrochromie elements and cataphoresis elements.

These solid state diaphragm devices have many characteristic features which the conventional mechanical diaphragms completely lack. The first is that since the mechanical coupling connection is unnecessary, it is of small size and light weight. Therefore, the degree of freedom on the camera design is largely increased. The second is that the diaphragm operates without causing the production of mechanical shocks and an unpleasant sound resulting therefrom at all. The third is that only one electrical switch suffices to perform a previewing operation with the diaphragm closed down. Further since the solid state diaphragm device works with at least electrical circuit means, it is suited for use in the recent, greatly electronically designed cameras with a great merit.

The present invention contemplates the use of an electrochromie substance. The term "electrochromie substance" herein used is a general term for substances which, when supplied with current, produce colors, or are subjected to a color change, and which then when the direction of current flow is reversed, discolor by themselves or regain the original ones, as the electrons supplied induce an oxidation-reduction reaction.

The important characteristic feature of the electrochromic cell is in its memory function. That is, the electrochromic cell when having once been colored by the current supply continues to remain colored after the current supply is cut off. Therefore, if the electrochromic cell is used as the diaphragm of the single lens reflex camera, it becomes possible that the diaphragm, after having once been excited by the current supply before a shutter release is actuated, is maintained in an operative or closed down position during the exposure operation even when the current supply is cut off. Therefore, the use of the electrochromic cell in the diaphragm device contributes to a decrease in the amount of consumption of electrical power, and particularly in the case of making exposures with long shutter times, a great advantage can be expected.

However, in applying the electrochromic cell in the practical diaphragm device of the single lens reflex camera, the following problems arise.

That is, as in the prior art, the cameras of the type in which the electrical power supply is latched by the first stroke of the shutter button have to release the latching of the power supply in synchronism with the completion of the shutter operation and stop the power supply. The mere application of the electrochromic cell to the conventional camera will result in that the termination of the exposure is not followed by the reset of the diaphragm to the full open position, and the field of view of the finder is left darkened. This is a very large drawback.

With the camera of the type having the main switch of the battery provided in separation, when it happens that the above-described main switch is opened, for example, at a time during long exposure, the electrochromic cell is caused to continue closed down. This drawback also must be eliminated.

SUMMARY OF THE INVENTION

It is an object of the present invention to solve the various problems which arise when an electrochromie substance having such memory function is employed in the diaphragm device of a camera.

Another object of the invention is to provide a camera having a many diaphragm device using an electrochromie substance.

According to an embodiment of the present invention, a sequence control is made so that after the power switch is opened, or after the shutter operation is completed, the latching period of the power supply is elongated by a predetermined interval in which the above-described electrochromic cell is supplied with the current flowing in the reversed direction to discolor by itself, thus resetting the diaphragm to the full open aperture position.

BRIEF DESCRIPTION OF THE DRAWINGS

FIG. 1 (*a*) is an electrical circuit diagram of a first embodiment of a drive circuit for a solid state diaphragm device according to the present invention.

FIG. 1(*b*) is a timing chart showing the waveforms occurring in the various portions of the circuit of FIG. 1(*a*).

FIG. 2(*a*) is a plan view of an example of a practical solid state diaphragm device of the area control type for use with the circuit of FIG. 1(*a*).

FIG. 2(*b*) is a sectional view of the device of FIG. 2(*a*).

FIG. 3(*a*) is an electrical circuit diagram of a second embodiment of the drive circuit for a solid state diaphragm device according to the present invention.

FIG. 3(*b*) is a timing chart showing the waveforms occurring in the various portions of the circuit of FIG. 3(*a*).

DESCRIPTION OF THE PREFERRED EMBODIMENTS

The present invention will next be described in connection with embodiments thereof.

Figure 1A:
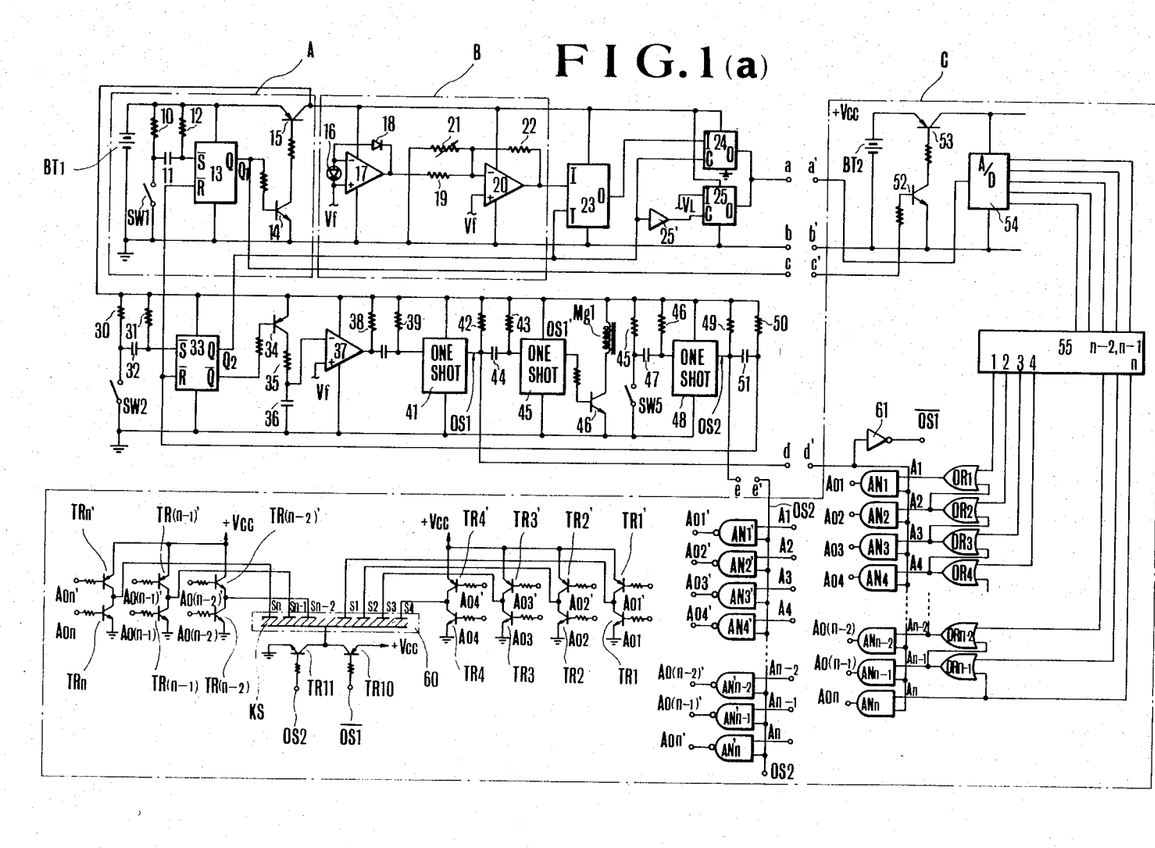
Figure 1B:
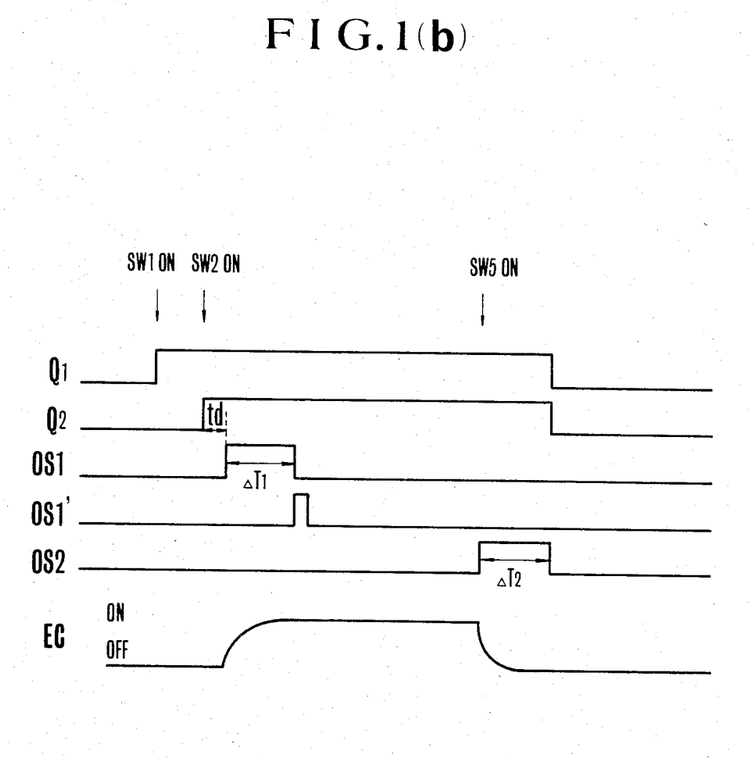

A first embodiment is shown in FIG. 1.

The features of this embodiment are as follows:

(a) An electrochromic substance is used to construct a diaphragm in the form of area control.

(b) The solid state diaphragm device is positioned in an interchangeable lens mounting.

(c) The transmission of aperture information ($\Delta Av$) representing the difference between the full open aperture and the required aperture value from the camera body to the diaphragm device in the lens mounting is constructed in the form of an interconnection terminal.

(d) A converter circuit for converting the above-described aperture information ($\Delta Av$) to a digital signal, and a drive circuit for the above-described solid state diaphragm device are positioned in said interchangeable lens mounting.

(e) The interchangeable lens mounting further contains an electrical power source or battery for supplying electrical energy to the above-described converter circuit and drive circuit alone.

(f) The above-described battery is provided with a power supply control switching means of which the ON and OFF operation is controlled by a signal from the camera body.

(g) The solid state diaphragm device is coordinated with the shutter in such a manner that just before the shutter starts to operate, the electrochromic substance completes the production of a color in the required portion of the area thereof, thus completing the closing down operation to the required aperture value, and that after the shutter operation is completed, a discoloring operation of the above-described electrochromic substance starts.

(h) A TTL full-open-aperture light metering type shutter priority automatic exposure camera is selected to employ the solid state diaphragm device.

In FIG. 1, there are shown an electrical power source circuit A, a light metering and exposure value computing circuit B, these circuits being positioned in the camera housing, and a circuit C positioned in the interchangeable lens mounting. The electrical power source circuit A includes a battery BT1, a normally open switch SW1 arranged to be closed when a shutter button of the camera is depressed to a first stroke, a differentiation circuit of resistors 10 and 12 and a condenser 11 for differentiating the potential variation across both terminals of the above-described switch SW1, and an RS flip-flop circuit 13 having a set input connected to the output of the above-described differentiation circuit. 14 and 15 are npn type and pnp type switching transistors respectively. The base of the switching transistor 14 is connected to the Q output of the above-described RS flip-flop circuit 13. The base of the transistor 15 is connected through a resistor to the collector of the transistor 14. It is noted that since the switching transistor 15 functions as a power supply control switch, its collector is connected to an electrical power line for the light metering and computing circuit B, and its emitter is connected to the battery BT1.

The light metering and exposure value computing circuit B includes a photo-voltaic cell (SPC) 16 positioned to receive light from an object, and an operational amplifier 17 constituting an SPC head amplifier with its two input terminals connected to the respective poles of the above-described SPC 16. Applied to its non-inversion input is a reference voltage Vf. Connected in its negative feedback network is a diode 18 for logarithmic compression. 20 is an operational amplifier for addition operation with its inversion input connected through a resistor 19 to the output of the above-described operational amplifier 17, and with its non-inversion input supplied with the reference voltage Vf. A variable resistor 21 for setting preselected shutter speed information and ASA sensitivity information of the used film is connected between the inversion input of the operational amplifier 17 and the circuit ground. 22 is a negative feedback resistor. A hold circuit 23 responsive to a trigger input T of high level (H level) holds a signal from an input I and produces it in the form of a voltage at the output 0 thereof. 24 and 25 are analogue switches, the analogue switch 24 having an input I connected to the output 0 of the above-described hold circuit, and the analogue switch 25 having an input to which a reference voltage $V_L$ of low level is applied. The outputs of the analogue switches 24 and 25 are both connected to a terminal "a" on the camera housing.

SW2 is a switch arranged to be closed when the shutter button is depressed to a second stroke; 30, 31 and 32 are resistors and a condenser constituting a differentiation circuit for differentiating the output of the switch SW2; 33 is an RS flip-flop circuit with its set input connected to the output of the above-described differentiation circuit (30, 31, 32) and with its Q output Q2 connected to the trigger terminal T of the above-described hold circuit 23 and the control input C of the above-described analogue switch 24 and through an inverter 25' to the control input C of the above-described analogue switch 25; 34 is a switching transistor with its base connected to the $\overline{Q}$ output of the above-described RS flip-flop circuit 23, with its collector connected to a timing circuit of a resistor 35 and a condenser 36, and with its emitter connected to the electrical power supply line; 37 is an operational amplifier constituting a comparator with its inversion input connected to a junction point of the above-described timing condenser and resistor and with its non-inversion input supplied with the reference voltage Vf; 38, 39 and 40 are resistors and a condenser constituting a differentiation circuit connected to the output of said operational amplifier 37 and having an output which is connected to a one-shot or multi vibrator 41. Said one-shot or multivibrator 41 has an output OS1 connected to a differentiation circuit of resistors 42 and 43 and a condenser 44 having an output which is connected to a one-shot or multivibrator 45. The output OS1' of the one-shot 45 is connected through a resistor to the base of a switching transistor 46 with its collector connected to an electromagnet Mg1. It is noted that this electromagnet Mg1 when energized releases a latching pawl from engagement with a shutter front curtain (not shown).

SW5 is a switch arranged to be closed when a trailing curtain of the shutter reaches the terminal end of running down movement; 45, 46 and 47 are resistors and a condenser constituting a differentiation circuit for differentiating the output of the above-described switch SW5. The output of the differentiation circuit (45, 46, 47) is connected to a one-shot or multivibrator 48 having an output OS2 which is connected to a differentiation circuit of resistors 49 and 50 and a condenser 51. The output of said differentiation circuit (49, 50, 51) is connected to the reset terminals of the RS flip-flop circuits 13 and 33.

The interchangeable lens-side circuit C includes an electrical power source or battery BT2, and switching transistors 52 and 53, the switching transistor 53 functioning as a power supply control switch with its base connected through a resistor to the collector of the switching transistor 52. The emitter of the transistor 53 is connected to the battery BT2, and its collector is connected to a power supply line of the interchangeable lens-side circuit C. Also the emitter of the transistor 52 is grounded, and its base is connected through a resistor to a terminal C'. 54 is an analog-to-digital converter receptive of an analog input signal from a terminal "a'" for producing a 5-bit binary coded signal. 55 is a decoder receptive of the 5-bit binary coded signal for producing a decimal coded signal. OR1-ORn-1 are two-input OR gates with inputs connected to the respective outputs 1, 2, ..., (n-1) of the decoder 55. The other inputs of OR1 to ORn-2 are connected to the outputs of OR2 to ORn-1 respectively. The other input of ORn-1 is connected to the output n of the above-described decoder 55. Here let us denote the outputs of the OR gates OR1-ORn-1 by A1-An-1 respectively and the output n of the decoder 55 by An. AN1-ANn are two-input AND gates, one inputs of AN1-ANn-1 being connected to the outputs of the above-described OR gates OR1-ORn-1, and one input of ANn being connected to the n output of the above-described decoder 55. All the other inputs of AN1-ANn are connected to a common terminal d' which is arranged to be connected with the terminal d and therefrom to the output OS1 of the one-shot multivibrator 41 in the camera housing. Here let us denote the outputs of said AND gates AN1-ANn by AO1-AOn respectively.

AN1'-ANn' are two-input NAND gates with their one inputs connected to the outputs A1-An of the OR gates OR1-ORn-1 and of the decoder 55. All the other inputs of said NAND gates AN1'-ANn' are connected to a common terminal e', the terminal e' being arranged to be connectable with a terminal e on the camera housing, and therefrom to the output OS2 of the one-shot multivibrator 48. Here let us denote the outputs AN1'-ANn' of the NAND gates by AO1'-AOn'.

Figure 2A:
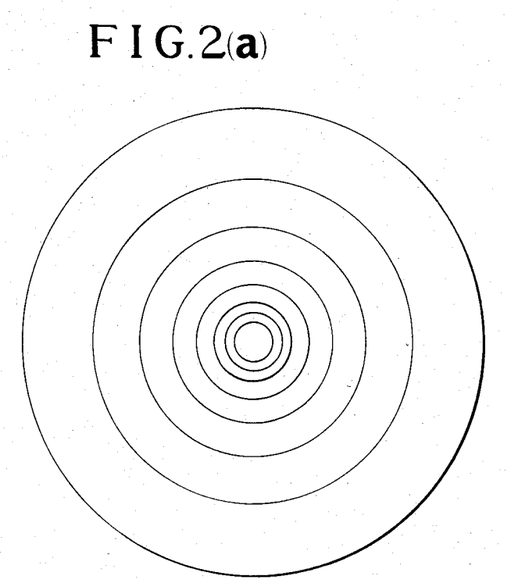
Figure 2B:
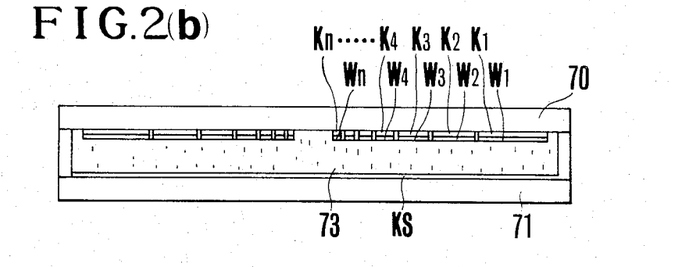

60 is a solid state diaphragm structure using an electrochromic substance as shown in FIGS. 2(a) and 2(b). S1-Sn are split transparent electrodes, and KS is a rear electrode. TR1-TRn are npn type switching transistors with their emitters all connected to the circuit earth, with their bases connected through resistors to the output AO1-AOn of the above-described AND gates AN-1-ANn, and with their collectors connected to the split transparent electrodes S1-Sn of the above-described electrochromic cell respectively.

TR1-TRn' are pnp type switching transistors with their bases connected through respective resistors to the outputs AO1'-AOn' of the above-described NAND gates AN1'-ANn', with their collector connected to the respective collectors of the above-described switching transistors TR1-TRn, and with their emitters all connected to a positive terminal +Vcc of the above-described interchangeable lens side battery BT2.

TR10 and TR11 are pnp type and npn type switching transistors respectively with their collectors connected to each other, the emitter of the switching transistor TR11 is grounded and the emitter terminal of the TR10 is connected to the above-described positive terminal +Vcc. Again the transistor TR10 is fed at its base terminal with the output OS1 of the camera side one-shot circuit 41 after it has been inverted. Again the transistor TR11 is fed at its base with the output OS2 of the camera side one-shot circuit 48.

a-e are interconnection terminals provided on the camera housing, and a'-e' are interconnection terminals provided on the interchangeable lens mounting. When the interchangeable lens is attached to the camera body, the terminals a-e are electrically connected to the terminals a'-e'. The "a" terminal is connected to the outputs of the above-described analogue switches 24 and 25, "b" terminal to the circuit ground, the "c" terminal to the Q output Q1 of the above-described RS flip-flop circuit 13, the "d" terminal to the output OS1 of the above-described one-shot multivibrator 41, and the "e" terminal to the output OS2 of the above-described multivibrator 48.

On the other hand, the "a'" terminal is connected to the input of an A/D converter 54, "b'" terminal to the ground potential level, the "c'" to the base of the switching transistor 52 through a resistor, the "d'" terminal to the one inputs of the AND gates AN1-ANn, and the "e'" terminal to the one inputs of the NAND gates AN1'-ANn'. Again connected to the "d'" terminal is an inverter circuit 61 whose output $\overline{OS1}$ is connected through a resistor to the base of the above-described pnp switching transistor TR10. Again connected to "e'" terminal is the base of the npn switching transistor TR11 through a resistor.

The operation of the circuit of such construction will next be described by reference to the timing chart of FIG. 1(b).

When the switch SW1 is closed by the first stroke of the shutter button (not shown), the differentiation circuit (10, 11, 12) produces a negative differentiation pulse which is applied to set the RS flip-flop circuit 13. As its Q output Q1 is changed to H level, the switching transistors 14 and 15 are turned on to start power supply to the circuit that follows. Since the SPC head amplifier or operational amplifier 17 produces an output in the form of an analog voltage representing the difference between the object brightness information Bv and the full open F-number information Avo of the objective lens, that is, Bv-Avo, this voltage is computed by the next-stage operational amplifier 20 with the shutter speed information Tv and film ASA sensitivity information Sv. Thus, the operational amplifier 20 produces an output in the form of an analog voltage corresponding to the number of aperture stops to be controlled, or ΔAv information. Such change of the Q output Q1 of the RS flip-flop circuit 13 to H level also causes the switching transistors 52 and 53 to be turned on through the c-c' connection, thereby the interchangeable lens side circuit is also supplied with electrical power.

Upon further depression of the shutter button to the second stroke, the switch SW2 is closed, and the differentiation circuit (30, 31, 32) produces a negative pulse which is applied to set the RS flip-flop circuit 33. As its Q output Q2 is changed to H level, the hold circuit 23 holds the output of the above-described operational amplifier 20 and then produces it. Such change also causes the output of the inverter circuit 25' to change to L level at which the analog switches 24 and 25 are turned on and off respectively. Therefore, the hold voltage of the hold circuit 23 appears at the interconnection terminal "a". Said hold voltage is converted to a 5-bit binary coded signal by the A/D converter 54, and this signal is further converted to a decimal coded signal by the next-stage decoder 55.

Since, on the other hand, the RS flip-flop circuit 33 when set changes its Q output Q2 to H level and its $\bar{Q}$ output to L level, the switching transistor 34 is turned on and charging of the timing condenser 36 through the resistor 35 starts. When the voltage on the condenser 36 reaches a predetermined level, as the invention input level of the comparator or operational amplifier 37 becomes higher than the non-inversion input level, the output of said operational amplifier 37 changes to L level. Responsive to this, the differentiation circuit (38, 39, 40) produces a negative pulse which then triggers the next-stage one-shot multivibrator 41. The output OS1 is then changed to high level and is maintained at this level for a predetermined period ($\Delta T1$) as shown in FIG. 1(b). This output OS1 of H level is applied through the interconnection terminals d-d' to the AND gates AN1-ANn at one inputs thereof.

Now assuming that the analog voltage held in the hold circuit 23 leads to the selection of the only one output stage 4 of the decoder 55 for appearance of a voltage of high level, then the OR gate OR4 changes the output A4 to H level, and is followed by the successive changes of the outputs A3, A2 and A1 of the OR3, OR2 and OR1 to H level. Therefore, during the time ($\Delta T1$) when the output OS1 of the above-described one-shot multivibrator 41 takes H level, the outputs AO1 to AO4 of the AND gates AN1 to AN4 are also changed to and maintained at the high level. Further since during this period the output $\overline{OS1}$ of the inverter circuit 61 is of L level, it is during this period $\Delta T1$ that the switching transistors TR1-TR4 and TR10 are ON, and therefore current flows through the switching transistor TR10 to each of the switching transistors TR1-TR4, thereby as will be more fully described later the tungsten oxide ($WO_3$) layer gradually develops color in the areas on the above-described split transparent electrodes S1 to S4. In the period $\Delta T1$, the color density becomes so high as to almost block light in the neighborhood of the transparent electrodes S1 to S4 amongst S1 to Sn.

Then, when the output OS1 of the above-described one-shot multivibrator 41 is returned from H to L level, the outputs AO1 to AO4 of the AND gates AN1-AN4 are also changed to L level, and the output $\overline{OS1}$ of the inverter circuit 61 is changed to H level, thereby the switching transistors TR1-TR4 and TR10 are turned off. Thus, the current supply to the solid state diaphragm structure 60 is cut off. Since, however, the electrochromic substance has the memory property, after the current supply has been cut off, the areas of the $WO_3$ layer which neighbor the transparent split electrodes S1 to S4 remains colored. As a result, the diaphragm continues assuming the closed down position.

On the other hand, when the output OS1 of the above-described one-shot multivibrator 41 is changed to L level, the next-stage differentiation circuit (42, 43, 44) produces a negative pulse. By said pulse, the next-stage one-shot multivibrator 45 is triggered and its output OS1' is changed to and maintained at H level for a short period. During this period, the switching transistor 46 is conducting so that the magnetic winding Mg1 is energized. This causes the upward movement of the quick return mirror. At a point in time when the mirror reaches the terminal end of movement, a mechanism (not shown) of known construction is actuated, causing the leading curtain of the shutter to run down, thus initiating an exposure. After a predetermined time interval therefrom, a shutter control circuit (not shown) starts a running down of the trailing curtain of the shutter. When said trailing curtain reaches the terminal end of movement, the switch SW5 is closed, and the differentiation circuit (45, 46, 47) produces a negative pulse. By said pulse, the one-shot multivibrator is triggered, and its output OS2 is changed to and maintained at H level for a period $\Delta T2$.

Since, at this time, the analog output voltage of the hold circuit 23 is held, and therefore, the output condition of the decoder 55 remains unchanged, the outputs A1 to A4 of OR gates OR1-OR4 hold H level. For the period $\Delta T2$ in which the output OS2 of the one-shot multivibrator 48 is of H level, therefore, the outputs AO1' to AO4' of the NAND gates AN1'-AN4' take L level. Thus, it is during this period that as the switching transistors TR1'-TR4' and TR11 are rendered conducting to permit current to flow in a direction from the TR1'-TR4' to the TR11, or in the reversed direction to that described above, the color in those of the areas of the $WO_3$ which neighbor the transparent split electrodes S1-S4 starts to disappear, and then at the termination of duration of the period $\Delta T2$ the entirely light transmitting condition is regained.

Then, when the output OS2 of the one-shot multivibrator 48 is changed to L level, the differentiation circuit (49, 50, 51) produces a negative pulse which is applied to reset the RS flip-flop circuits 13 and 33. As the Q output of the flip-flop circuit 13 is changed to L level, the switching transistors 14 and 15 are turned off to stop the power supply to the camera body side circuit. Likewise, the interchangeable lens side switching transistors 52 and 53 are also turned off to stop the power supply to the interchangeable lens side circuit alike.

Thus, one cycle of photographing sequence operation is completed.

It is noted in connection with the circuit of FIG. 1(a) that when the shutter button is restrained from advancing from the first to the second stroke, the above-described RS flip-flop circuit 33 is not brought into the set position and therefore its Q output Q2 is of L level at which the output of the inverter circuit 25' is of H level. Therefore, the analog switch 24 is turned off, while the analog switch 25 is turned on, so that the voltage $V_L$ of low level appears at the interconnection terminal, a. Therefore, the various bit outputs of the A/D converter 54 in the interchangeable lens mounting are of L level, and the various outputs of the decoder 55 are also of L level. Thus, the solid state diaphragm 60 is prevented from being closed down and the light metering can be carried out at the full open aperture.

It is also noted that the resistor 35 and the condenser 36 provide a timing circuit for forming a delay time, td, in order to insure that as the $\Delta Av$ information is processed through the analog switch 24, A/D converter 25 and decoder 55 to produce a signal, this signal is stabilized before the color developing operation of the solid state diaphragm structure starts.

FIGS. 2(a) and 2(b) show an example of construction of the practical electrochromie type solid state diaphragm. The illustrated solid state diaphragm is constructed in the area control form.

In FIG. 2(b), 70 and 71 are transparent substrates facing to each other; K1-Kn are ring-like transparent split electrodes formed on said transparent substrate 70; W1-Wn are ring-like WO3 (tungsten oxide) thin films formed on said split electrodes K1-Kn; KS is a crystalized transparent WO3 film formed on the other transparent substrate 71 (rear electrode); 73 is an electrolyte, for example, WO3-containing H2SO4. In this condition, when, for example, the transparent split electrodes K1 and K2 are biased to a negative pole, and the rear electrode KS to a positive pole, the WO3 thin film develops a color in the areas W1 and W2, finally becoming opaque. After that, when the transparent split electrodes K1 and K2 are biased to the positive pole, and the rear electrode KS to the negative pole, current flows in the reversed direction to that described above, the WO3 thin film discolors, finally becoming transparent.

Next explanation is given to a second embodiment of the circuit by reference to FIG. 3(a). The characteristic features of this embodiment are as follows:

(a') An electrochromie substance is used to form a diaphragm having a constant size of aperture opening with variation of the light transmittance therethrough.

(b') The solid state diaphragm device is positioned in an interchangeable lens mounting.

(c') The amount of reduction of the transmittance of the solid state diaphragm aperture (which corresponds to the required number of aperture stops to be closed down from the full open aperture) is adjusted by controlling the period of current flow to said solid state diaphragm device.

(d') The solid state diaphragm device is coordinated with the shutter of the camera in such a manner that before the start of a shutter operation, the color development of the electrochromie layer is completed as if the diaphragm is closed down to the required aperture value, and that after the shutter operation is completed, a discoloring operation of said electrochromie layer starts.

(e') The electrical power supply to the solid state diaphragm device in the interchangeable lens mounting is made from the electrical power source of battery in the camera housing, and the current transmission is constructed in the form of a connector member.

(f') A TTL full-open-aperture light-meter type shutter speed priority automatic exposure camera is selected for application thereof.

In FIG. 3(a), A denotes an electrical power source circuit positioned on the camera body side, B a light metering and exposure value computing circuit, and C a circuit provided in the interchangeable lens mounting. Since the circuit B is similar in construction to that of FIG. 1(a), no explanation is given below.

Resistors 70 and 71 and a condenser 72 constitute a differentiation circuit. A one-shot or multivibrator 73 is connected to said differentiation circuit and has its output OS10 connected to the input of a differentiation circuit of resistors 74 and 75 and a condenser 76. Resistors 77 and 78 and a condenser 79 constitutes a differentiation circuit having an output which is connected to the input of a one-shot or multivibrator 80. A switching transistor 80 has a collector connected to an electromagnet Mg1 controlling the release of the leading curtain of the shutter from latching connection, a base connected to the output OS11 of the one-shot multivibrator 80 through a resistor and an emitter connected to the circuit ground.

SW3 is a switch arranged to be closed in synchronism with the start of running down of the leading curtain of the shutter. Resistors 82 and 83 and a condenser 84 constitute a differentiation circuit. A timer circuit 87 is connected at its trigger terminal T to the output of the above-described differentiation circuit (82, 83, 84). A variable resistor 85 and a condenser 86 constitute a timing circuit for setting a timed interval of the timer circuit 87, as the input of the timer circuit 87 is conneted to a junction point of the resistor 85 and condenser 86. The variable resistor 85 has a resistance value related to the preset shutter speed information. Resistors 88 and 89 and a condenser 90 constitute a differentiation circuit having an input connected to the output of the above-described timer circuit 87 and an output connected to a one-shot multivibrator 91. A switching transistor 92 has a collector connected to an electromagnet Mg2 controlling the release of the trailing curtain of the shutter from latching connection, a base connected to the output OS12 of the above-described one-shot multivibrator 91 through a resistor and an emitter connected to the circuit ground.

A hold circuit 93 has its input connected to the output of the operational amplifier 20 in the light metering and exposure value computing circuit B and its trigger terminal T connected to the output of the above-described differentiation circuit (70, 71, 72). A timer circuit 96 has its trigger terminal T connected to the output of the above-described differentiation circuit (74, 75, 76). A variable resistor 94 and a condenser 95 are connected in series to each other form a timing circuit for setting a timed interval of the timer circuit 96. The opposite end of the resistor 94 is connected to the output of the hold circuit 93, and the opposite pole of the condenser 95 is connected to the circuit ground. The input of the timer circuit 96 is connected to this junction point of the resistor 94 and condenser 95, and the output is connected to the input of the differentiation circuit (77, 78, 79).

SW5 is a switch arranged to be closed when the trailing curtain of the shutter reaches the terminal end of running down movement. Resistors 97 and 98 and a condenser 99 constitute a differentiation circuit for differentiating the output of the switch SW5. A timer circuit 102 has its trigger terminal T connected to the output of the differentiation circuit (97, 98, 99). A resistor 100 and a condenser 101 are connected in series to each other to form a timing circuit for setting a timed interval of the timer circuit 102 as the junction point of the resistor 100 and the condenser 101 is connected to the input of the timer circuit 102. The opposite end of the resistor 100 is connected to the output of the hold circuit 93, and the opposite pole of the condenser 101 is connected to the circuit ground. Resistors 103 and 104 and a condenser 105 constitute a differentiation circuit having an input connected to the output of the timer circuit 102, and an output connected to the reset terminal of the RS flip-flop circuit 13 in the above-described electrical power source circuit A. f-i are interconnection terminals provided on the camera housing, and f'-i' are ones provided on the interchangeable lens mounting. When the interchangeable lens is attached to the camera body, electrical connections are established between the above-described terminals f-f', g-g', h-h' and I-i'.

The terminal, f, is the outlet of the positive power line, the terminal, g, the outlet of the output line of the timer circuit 102, the terminal, h, the outlet of the output line from the timer circuit 96, and the terminal, i, the inlet of the circuit ground.

The circuit C in the interchangeable lens mounting includes pnp transistors 106 and 108 and npn transistors 107 and 109, these parts constituting a bridge circuit. 110 and 111 are constant current circuits, and 112 is a solid state diaphragm using an electrochromie substance. Inverter circuits 113 and 114 have inputs connected to the terminals h' and g' respectively and have outputs connected through resistors to the bases of the transistors 106 and 108 respectively. The base terminals of the transistors 107 and 109 are connected to the above-described interconnection terminals g' and h' respectively. The emitter of the transistors 107 and 109 are both connected to the interconnection terminal, i', and the emitters of the transistors 106 and 108 are both connected to the interconnection terminal, f'. The collector of the transistor 106 is connected through the current source 110 to the collector of the transistor 107, and the point on connection between the current source 110 and the transistor 107 is connected to one end of the solid state diaphragm. The collector of the transistor 108 is connected through the current source 111 to the collector of the transistor 109, and the point on connection between the current source 111 and the transistor 109 is connected to the opposite end of the solid state diaphragm 112.

The operation of the circuit of such construction of FIG. 3(a) will next be described by reference to the timing chart of FIG. 3(b).

When a shutter button (not shown) is depressed to a first stroke, the switch SW1 is closed, thereby as has been mentioned in connection with FIG. 1(a), the power supply control switching transistor 15 is turned on to supply the various circuit portions with current.

Upon further depression to a second stroke, the switch SW2 is closed, and the differentiation circuit (70, 71, 72) produces a negative pulse. By this pulse, the next-stage one-shot multivibrator 73 is triggered to produce one pulse at its output OS10 as shown in FIG. 3(b). Also by the negative pulse from the differentiation circuit (70, 71, 72), the hold circuit 93 is triggered to hold and produce an analog voltage corresponding to the diaphragm-down information $\Delta Av$ from the above-described operational amplifier 20. Then, at the time of the falling edge of the one pulse from the one-shot multivibrator 73, the differentiation circuit (74, 75, 76) produces a negative pulse which is then applied to trigger the timer circuit. Therefore, its output T1 is changed to and maintained at H level only for a certain period $\Delta T1'$ depending upon the analog output voltage value of the timing circuit (94, 95) and the hold circuit 93. Said signal is applied through the interconnection terminals h-h' to the interchangeable lens side circuit C, causing the output of the inverter circuit 113 to change to L level. Therefore, the switching transistors 106 and 109 are turned on to allow a constant current regulated by the constant current circuit 110 to flow to the solid state diaphragm comprised of the electrochromie substance in a color developing direction indicated by arrow A. Thus, the solid state diaphragm starts to gradually develop color. It should be pointed out that as the period during which current is flowing to the solid state diaphragm 112 in a direction to develop color is defined by the interval $\Delta T1'$ in which the output T1 of the timer circuit 96 takes H level, this $\Delta T1'$ depends upon the analog voltage value corresponding to the diaphragm-down information $\Delta Av$ held in and sent from the hold circuit 93. Thus, the amount of current supplied to the solid state diaphragm 112 for color development is controlled in accordance with the value $\Delta Av$, so that the required rate of reduction of the light transmittance is attained, corresponding to the closing down of the diaphragm from the full open aperture.

When the output T1 of the timer circuit 96 regains L level, the output of the inverter circuit 113 is changed to H level at which the switching transistors 106 and 109 are turned off to stop the current supply to the solid state diaphragm 112. From this time onward, the electrochromie type solid state diaphragm 112 continues holding itself in the closed down state.

Such change of the output T1 of the timer circuit 96 to L level also causes the differentiation circuit (77, 78, 79) to produce a negative pulse. By said pulse, the next-stage one-shot multivibrator 80 is triggered to produce one pulse at its output OS11 as shown in FIG. 3(b). During the time of occurrence of this pulse, the switching transistor 81 is ON, and the electromagnet Mg1 for releasing the leading curtain of the shutter from the latching connection is energized. This first results in upward movement of the quick return mirror. When the terminal end of upward movement is reached, the leading curtain of the shutter starts to run down. In synchronism with the start of this running down movement, the switch SW3 is closed and the differentiation circuit (82, 83, 84) produces a negative pulse which is then applied to trigger the timer circuit 87, thereby its output T2 is changed to H level. The period for which the output T2 of the timer circuit 87 is maintained at H level is determined by the timing circuit (85, 86). Since the variable resistor 85 is cooperative with the preset shutter speed information, we see that period for which the output T2 of the timer circuit 87 takes H level represents the preset shutter time. When the output T2 of the timer circuit 87 is changed to L level again, the differentiation circuit (88, 89, 90) produces a negative pulse. By this pulse, the next-stage one-shot multivibrator 91 is triggered to produce one pulse at the output OS12 thereof as shown in FIG. 3(b), which is then applied to turn on the switching transistor 92, thereby the electromagnet Mg2 is energized. Thus, the trailing curtain of the shutter starts to run down.

When the trailing curtains reach the terminal end of movement, the switch SW5 is closed and the differentiation circuit (97, 98, 99) produces a negative pulse which is then applied to trigger the timer circuit 102. Therefore, its output T3 is changed to and maintained at H level for a period $\Delta T2'$ depending upon the analog output voltage value of the hold circuit 93 and the timing circuit (100, 101). Since the output of the inverter circuit 114 is of L level, the switching transistors 107 and 108 are turned on to allow the solid state diaphragm 112 using the electrochromie substance to be supplied with a constant current regulated by the constant current circuit 111 and flowing in a direction indicated by arrow B to effect disappearance of the color. As the period during which the output T3 of the timer circuit 102 is of H level is adjusted to the $\Delta T2'$, this period $\Delta T2'$ depends upon the analog voltage value corresponding to the diaphragm-down information $\Delta Av$ held in and sent from the hold circuit 93, provided that the timing circuit (100, 101) is fixed. Therefore, it is ascertained that the reversed current flows in an amount large enough to cancel out the above-described density of color developed. Then, when the output T3 of the timer circuit 102 is changed to L level again, the differentiation circuit (103, 104, 105) produces a negative pulse which is applied to reset the above-described flip-flop circuit 13. As its Q output Q1 is changed to L level, the switching transistors 14 and 15 are turned off, thereby the power supply to the various circuit portions is cut off. Thus, one cycle of photographing sequence is completed.

Figure 4A:
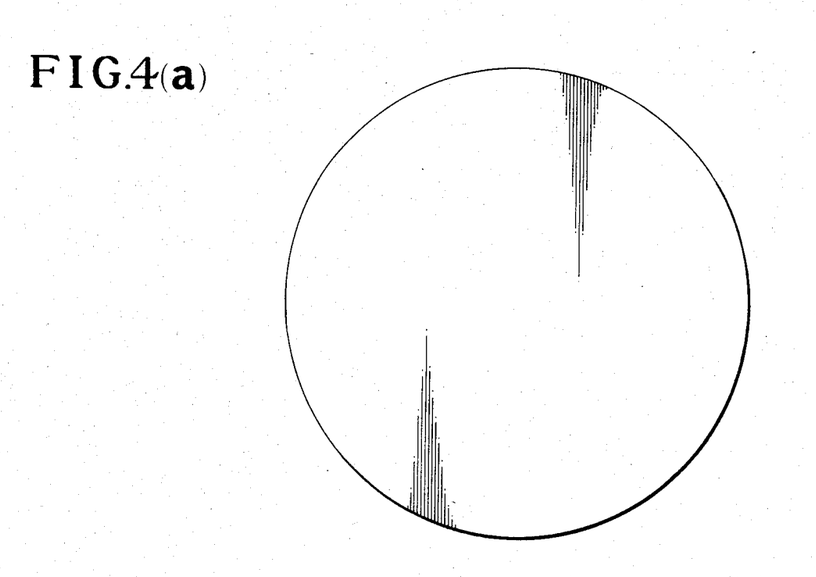
FIG. 4(a) is a plan view of an example of a practical light transmittance control type solid state diaphragm device for use with the circuit of FIG. 3.
Figure 4B:
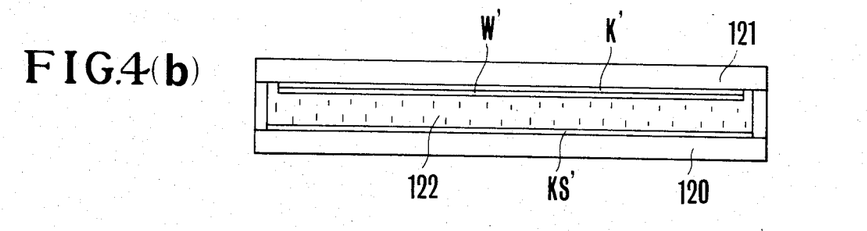
FIG. 4(b) is a sectional view of the device of FIG. 4(a).

FIGS. 4(a) and 4(b) show the structure of the practical transmittance control type solid state diaphragm used in the second embodiment. In FIG. 4(b), transparent plates 120 and 121 are positioned in facing relation to each other. Transparent electrodes K' and KS' are formed on the transparent plates 120 and 121 respectively. A thin layer of WO$_3$ (tungsten oxide) is formed on the transparent electrode K' and is indicated at W'. 122 is an electrolyte, for example, H$_2$SO$_4$ containing WO$_3$. With this, when the transparent electrode K' is biased to a negative pole, and the transparent electrode KS' to a positive pole, the WO$_3$ layer W' develops color. The density of color depends upon the amount of current supplied. Conversely when the transparent electrodes K' and KS' are biased to the positive and negative poles respectively, as the current flows in the reversed direction to that described above, the WO$_3$ layer W' discolors itself.

Figure 5:
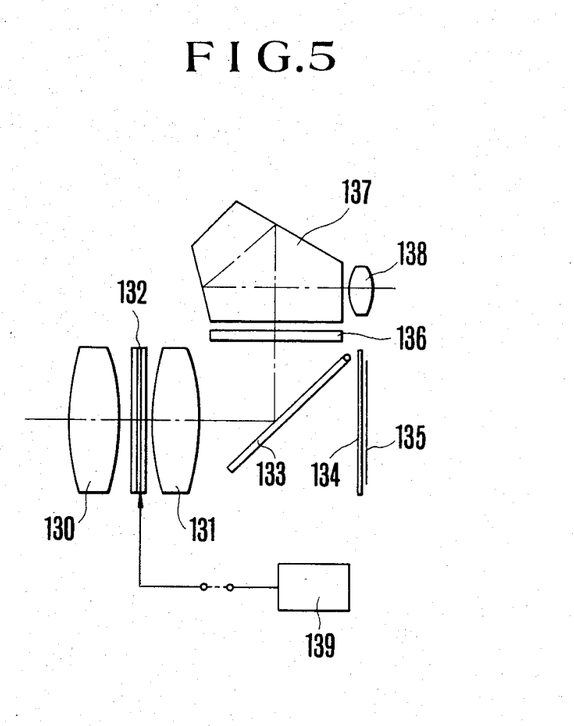
FIG. 5 is a schematic side sectional view of a single lens reflex camera with the electrochromic type solid state diaphragm device.

FIG. 5 shows an example of arrangement of the electrochromic solid state diaphragm in a camera.

In FIG. 5, 130 and 131 are an objective lens; 132 is the electrochromic solid state diaphragm; 133 is a quick return mirror; 134 is a focal plane type shutter; 135 is a film; 136 is a focusing screen; 137 is a penta prism; and 138 is an eye-piece lens. A drive circuit for the electrochromic solid state diaphragm is indicated at 139.

Next explanation is given to a third embodiment of the present invention. This embodiment is characterized in that while the first and the second embodiments provide the coordination control that the running down of the trailing curtain of the shutter is followed by the discoloration of the solid state diaphragm, the solid state diaphragm is coordinated not only with the shutter but also with a power switch in such a manner that as the closure of the power switch leads to the start of a power supply, after the power switch is opened, a current is caused to flow to the solid state diaphragm in the discoloration direction by a predetermined time, thereby the solid state diaphragm is reset in the full-open-aperture position. Therefore, it is made possible to prevent unintentional hold of setting the solid state diaphragm in the closed down position as it occurs when the power switch is opened at a time during the exposure operation with a long shutter time.

Figure 3:
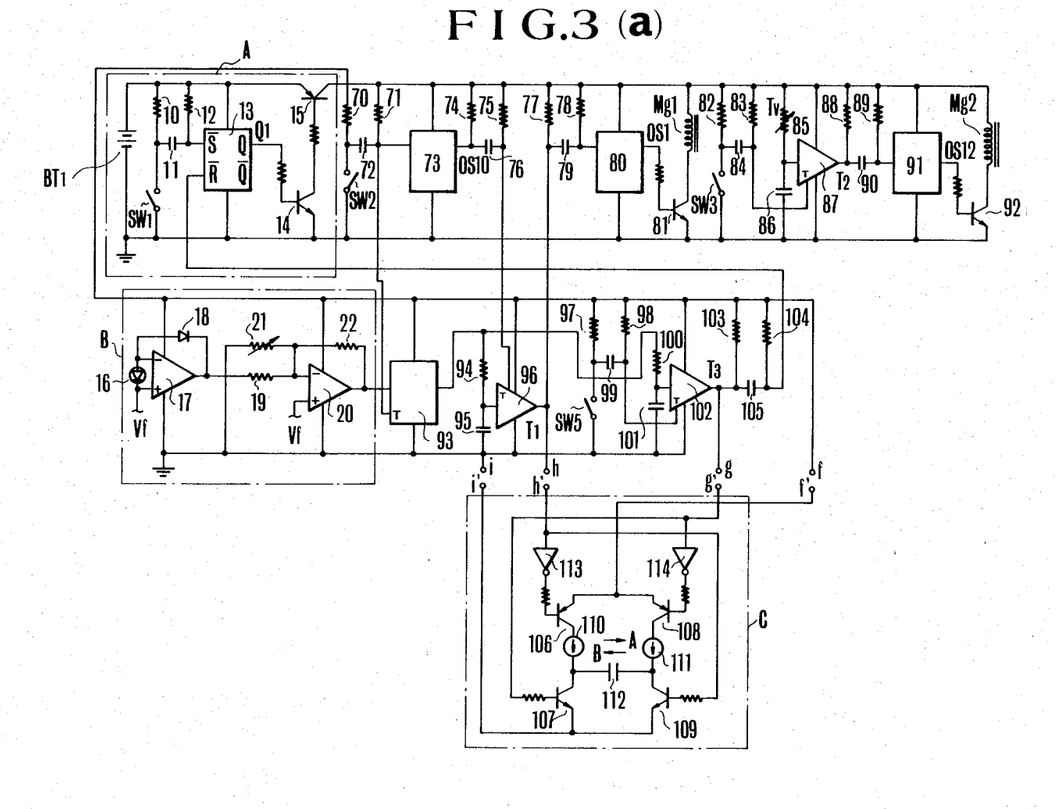
Figure 6:
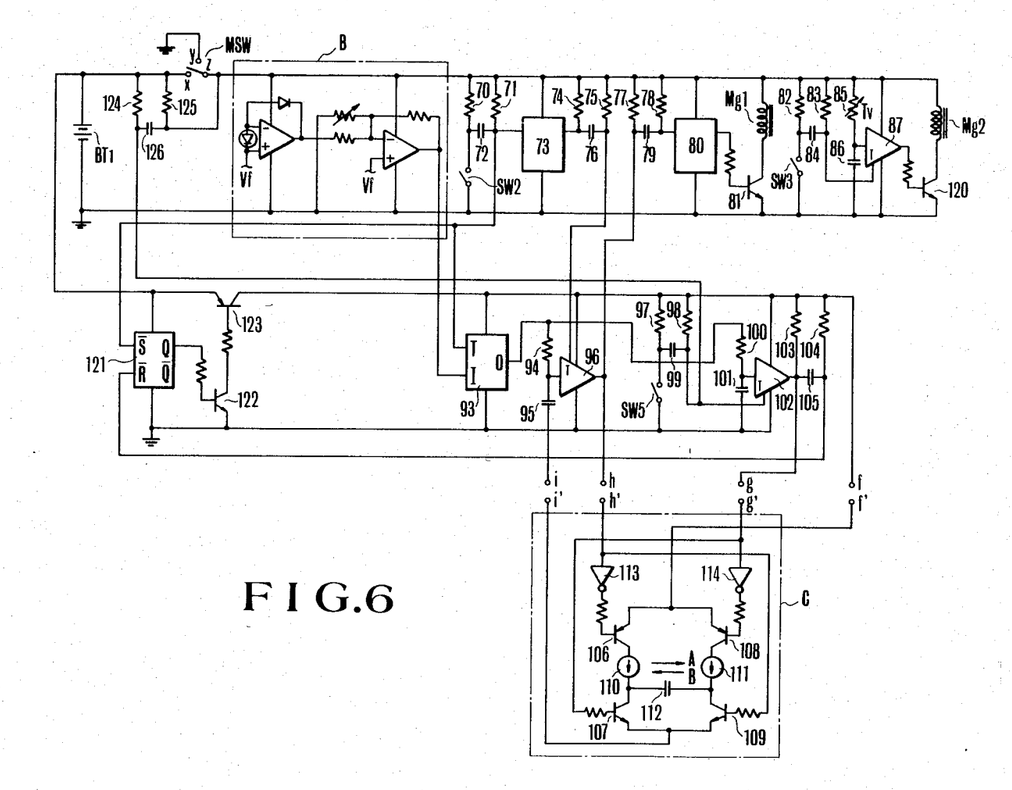
FIG. 6 is an electrical circuit diagram showing a third embodiment of the present invention.

In FIG. 6, B is a light metering and exposure value computing circuit, and C is a drive circuit for the electrochromic solid state diaphragm in the interchangeable lens mounting. Those of the other parts which are denoted by the same reference numerals as in FIG. 3 are the like parts and are similar in function also. Therefore, no more detailed explanation is given to them.

MSW is a main switch of the camera. In the closed position, an "x" contact is under contact. In the open position, a "y" contact is under contact. The "y" contact is grounded. Resistors 124 and 125 and a condenser 126 constitute a differentiation circuit having an input connected to the common contact, z, of the above-described main switch MSW, and an output connected to the trigger terminal of the timer circuit 102. An RS flip-flop circuit 121 has its set input connected to the output of the differentiation circuit (70, 71, 72), and a reset input connected to the output of the differentiation circuit (103, 104, 105). A switching transistor 120 is connected to the output of the timer circuit 87. An electromagnet Mg2' controlling the operation of the trailing curtain of the shutter is connected to the collector of the switching transistor 120, and is, in this instance, of the attraction type so that when energized, it holds latching the trailing curtain of the shutter, and when de-energized, releases the latching.

The operation of the circuit of such construction will be briefly explained below.

Where the operation of the circuit of FIG. 3 is repeated is no more explained.

After the main switch MS2 is closed by moving the contact, z, to the contact, x, when the switch SW2 is closed to actuate a release of the shutter, the differentiation circuit (70, 71, 72) produces a negative pulse. By said pulse, the RS flip-flop circuit 121 is set and its Q output is changed to H level at which the switching transistors 122 and 123 are turned on to supply the circuit that follows with electrical energy. The manner in which said circuit operates when in the normal shutter mode is similar to that described in connection with FIG. 3. But in this embodiment, because of the electromagnet MG2' for the control of the trailing curtain of the shutter being of the attraction type, the start of a running down of the shutter leading curtain leads to the production of a negative pulse from the differentiation (82, 83, 84) and the timer circuit 87 is set by said pulse to produce an output which takes H level for a certain period determined by the timing circuit (85, 86). Therefore, it is during this period that the electromagnet Mg2' is being energized to hold the trailing curtain of the shutter in the latched position. Then when the output of the timer circuit 87 is changed to L level, the switching transistor 120 is turned off to de-energize the electromagnet Mg2' and the trailing curtain of the shutter starts to run down. When the terminal end of movement of the trailing curtain is reached, the switch SW5 is closed and the differentiation circuit (97, 98, 99) produces a negative pulse. By said pulse, the timer circuit 102 is triggered to produce an output which takes H level for a period corresponding to the timing circuit (100, 101) and the analog output voltage value of the hold circuit 93. It is during this period that as has been mentioned in connection with FIG. 3, the electrochromic solid state diaphragm is supplied with current flowing in a direction to discolor. Then when the output of the timer circuit 102 is changed to L level again, the next-stage differentiation circuit (103, 104, 105) produces a negative pulse which is then applied to reset the above-described RS flip-flop 121. As its Q output is changed to L level, the switching transistors 122 and 123 are turned off to stop the power supply to the circuit that follows. The foregoing procedure is in normal operation similar to that described in connection with the second embodiment.

Next explanation is given to a particular case where the main switch MSW is opened at a time during the shutter operation. Since, in this case, the main switch MSW has the "y" contact connected, the differentiation circuit (124, 125, 126) produces a negative pulse.

By this pulse, the timer circuit 102 is triggered and its output is changed to H level. As has been mentioned before, the electrochromic solid state diaphragm is supplied with current flowing in a direction to discolor. Then, when the output of the timer circuit 102 is changed to L level again, the differentiation circuit (103, 104, 105) produces a negative pulse which is applied to reset the RS flip-flop circuit 121, thereby the switching transistors 122 and 123 are turned off to stop the power supply to the circuit that follows.

It is to be noted that in this embodiment when the main switch MSW is opened, the current supply to the electromagnet Mg2' is cut off, causing the trailing curtain of the shutter to run down, and therefore that this main switch serves as an exposure time control member.

It is also to be noted that according to the present invention, not only after the exposure has been completed, but also when the main switch is accidentally opened at a time during the shutter operation, the electrochromic solid state diaphragm is made ready for the next shot, as it regains the full-open-aperture position.

Though the above embodiments have been described as the release of the leading curtain of the shutter from the latching with the start of upward movement of the quick return mirror defers pending the completion of the closing down operation of the solid state diaphragm, it is of course possible that the both operations proceed in parallel with each other.

Further it is recommended that the electrochromic cell for use in the present invention has to be flat in spectral transmittance when in the colored and discolored conditions.

It will be seen from the foregoing that the present invention is intended to provide a drive circuit capable of resetting the electrochromic solid state diaphragm to the full-open-aperture position.

An advantage is that, in the solid state diaphragm device using an electrochromie substance, the preliminary electrical power supply to the electrochromie substance with the suitable control of the current flow direction for color development suffices to maintain the electrochromie substance in the operative position during the subsequent exposure operation regardless of however long the exposure time, thereby the amount of consumption of electrical energy in driving the diaphragm can be remarkably reduced.

Another advantage is that, since there is no need to use a polarizer which would be otherwise necessary as when the liquid crystal cell is used, because of no loss due to this, the dynamic range of aperture control can be widened, and even when a skew pencil of light rays is incident on the diaphragm, an error due to the transmission of this is avoided.

Accordingly it is possible to provide a solid state diaphragm device of simple construction for use in a photographic camera while nevertheless maintaining a very high accuracy of exposure control.

What is claimed is:

1. A camera having a solid state diaphragm device, including:
   (a) a solid state diaphragm device, said device containing an electrochromie substance which, when supplied with current flowing in a prescribed direction, changes its light transmittance, and upon cutting off of the current holds the resultant transmittance and being arranged in a position where a light beam from an object being photographed to film in the camera can be limited;
   (b) light metering means, said means producing an electrical signal representing the object brightness;
   (c) shutter means, said means being able to pass the light beam from the object for a predetermined time or dependent on said electrical signal;
   (d) drive control circuit means, said means supplying said solid state diaphragm device with current flowing in a direction to reduce the light transmittance of said electrochromie substance only for a predetermined time prior to the start of the light beam passing operation of said shutter means, and upon detection of the termination of the light beam passing operation of said shutter means, supplying said solid state diaphragm device with current flowing in a direction to increase the light transmittance of said electrochromie substance; and
   (e) power supply holding circuit means for operating in a manner so that after the start of current supply to an electrical circuit network of said camera by said means, this current supply to the electrical circuit network of the camera continues until the supplying of current in the direction to increase the light transmittance of said electrochromie substance by said drive control circuit is completed for the opening of the diaphragm device.

2. A camera having a solid state diaphragm device, including:
   (a) a solid state diaphragm device, said device containing an electrochromie substance which, when supplied with current flowing in a prescribed direction, changes its light transmittance, and upon cutting off of the current holds the resultant transmittance and being arranged in a position where a light beam from an object being photographed to film in the camera can be limited;
   (b) light metering means, said means producing an electrical signal representing the object brightness;
   (c) shutter means, said means being able to pass the light beam from the object only for a predetermined time; and
   (d) drive control circuit means, said means supplying said solid state diaphragm device with current flowing in a direction to reduce the light transmittance of said electrochromie substance only for a predetermined time prior to the start of the light beam passing operation of said shutter means, and upon detection of the termination of the light beam blocking operation of said shutter means, supplying said solid state diaphragm device with current flowing in a direction to increase the light transmittance of said electrochromie substance for the opening of the diaphragm device; and wherein the period for which said drive control circuit means supplies said solid state diaphragm device with current is varied in response to the output of said light metering circuit means.

3. A camera having a solid state diaphragm device according to claim 1, wherein said solid state diaphragm device has a plurality of pairs of transparent electrodes facing each other, whereby, when a predetermined amount of current is allowed to flow between the required transparent electrode pair or pairs, the light transmittance of the electrochromie substance provided on one of the electrodes is varied, and wherein, of the plurality of transparent electrode pairs of said solid state diaphragm device, the electrode pair or pairs to which said predetermined amount of current is supplied is or are selected depending upon the output of said light metering circuit means.

* * * * *